United States Patent [19]
Adams

[11] 3,964,706
[45] June 22, 1976

[54] HOLDER ASSEMBLY FOR FISHING RODS AND FISHING ACCESSORIES

[76] Inventor: John R. Adams, 835 Summit Ave., Franklin Lakes, N.J. 07417

[22] Filed: Nov. 1, 1974

[21] Appl. No.: 520,169

[52] U.S. Cl. .................................. 43/21.2; 248/513; 248/534; 248/538
[51] Int. Cl.² ........................................ A01K 97/10
[58] Field of Search .................. 248/42, 38, 39, 40, 248/43, 44; 42/21.2

[56] References Cited
UNITED STATES PATENTS

| | | | |
|---|---|---|---|
| 545,385 | 8/1895 | Simpson | 248/42 X |
| 1,653,897 | 12/1927 | Farr | 248/44 UX |
| 1,877,845 | 9/1932 | Gerline | 248/40 |
| 2,452,279 | 10/1948 | Young | 248/40 |
| 3,063,668 | 11/1962 | Yohe | 248/42 X |
| 3,154,274 | 10/1964 | Hillcourt | 248/42 |
| 3,159,366 | 12/1964 | Knight | 248/42 |
| 3,783,547 | 1/1974 | Bystrom | 43/21.2 |
| 3,802,112 | 4/1974 | Banner | 43/21.2 |

*Primary Examiner*—J. Franklin Foss
*Attorney, Agent, or Firm*—Berman, Aisenberg & Platt

[57] ABSTRACT

A holder assembly for a fishing rod or the like, including a number of readily replaceable elements adapted to hold any standard fishing rod during actual fishing, as in trolling, and safely store the rod while cruising to and from the fishing grounds, the assembly comprising a mounting base with keyhole connecting means for quickly attaching to or detaching from a supporting surface, a tubular socket on the base, an elongated sleeve for slidably receiving and holding a fishing rod handle, and means for readily securing and detaching the sleeve to and from said socket. The substitution of another sleeve having a portion with a larger diameter enables the holding of larger and heavier fishing rods. The substitution of another mounting base having a different angular arrangement of the tubular socket renders the holder assembly readily mountable on vertical, horizontal or angled supporting surfaces of a boat and permits the changing of the angular position of the held fishing rod.

14 Claims, 21 Drawing Figures

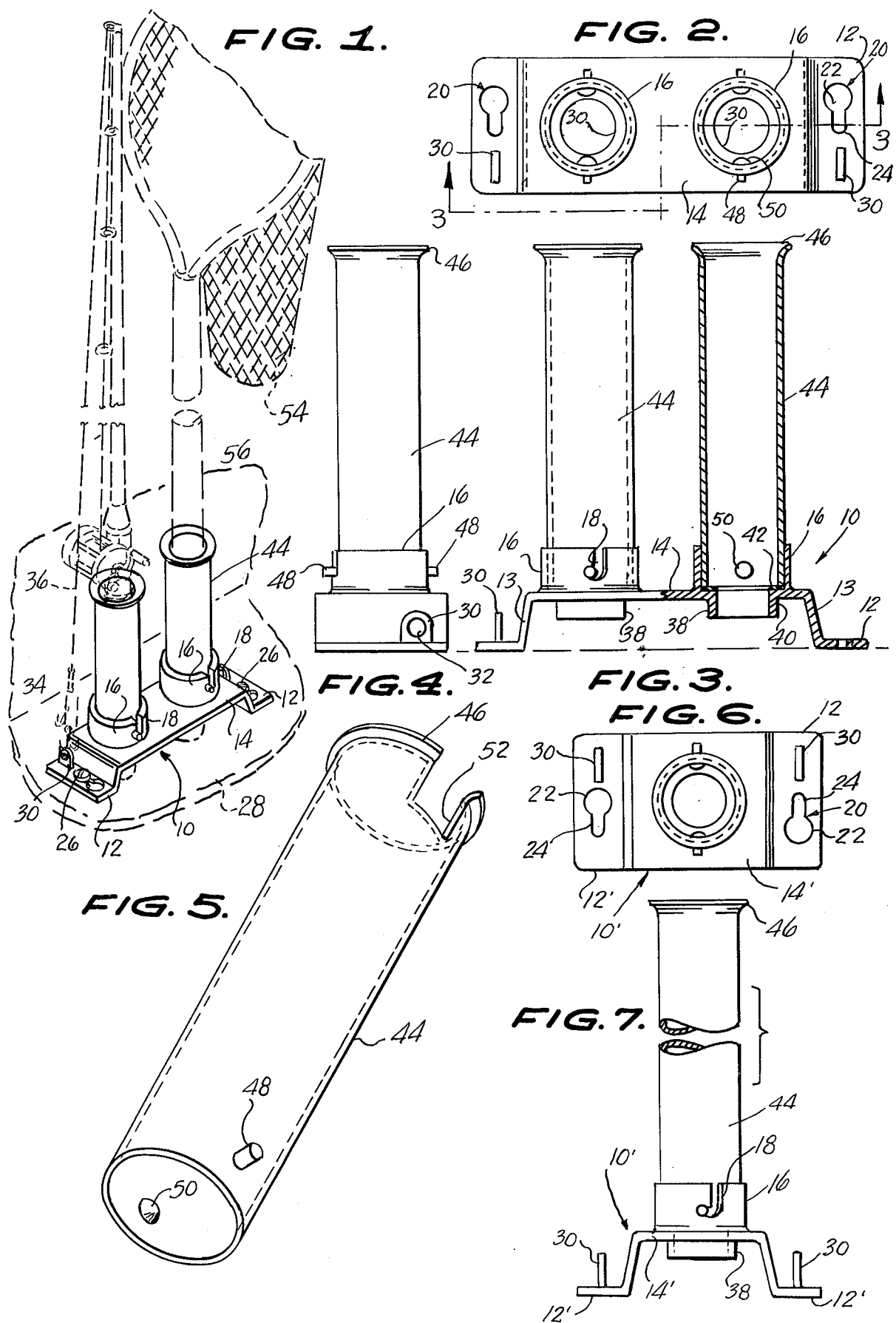

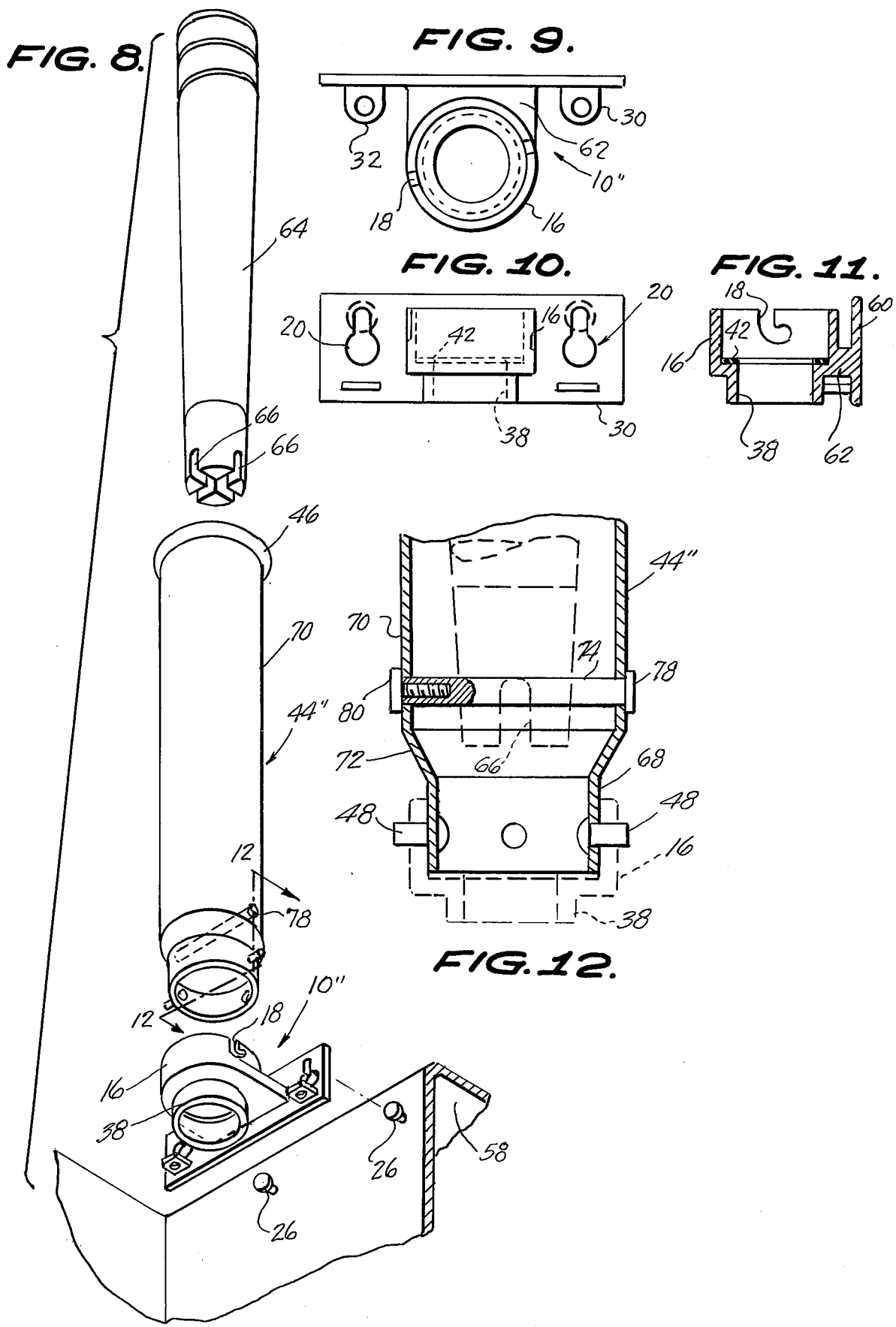

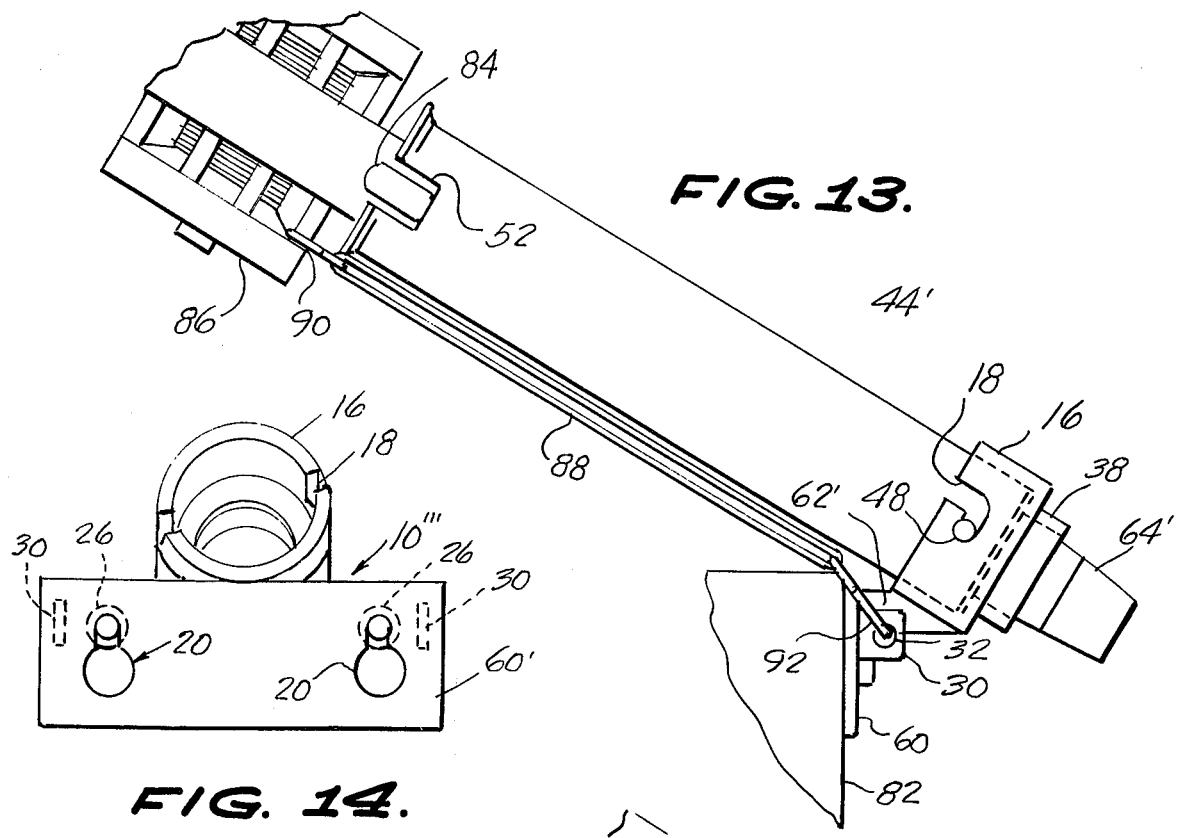
FIG. 13.
FIG. 14.
FIG. 15.
FIG. 16.
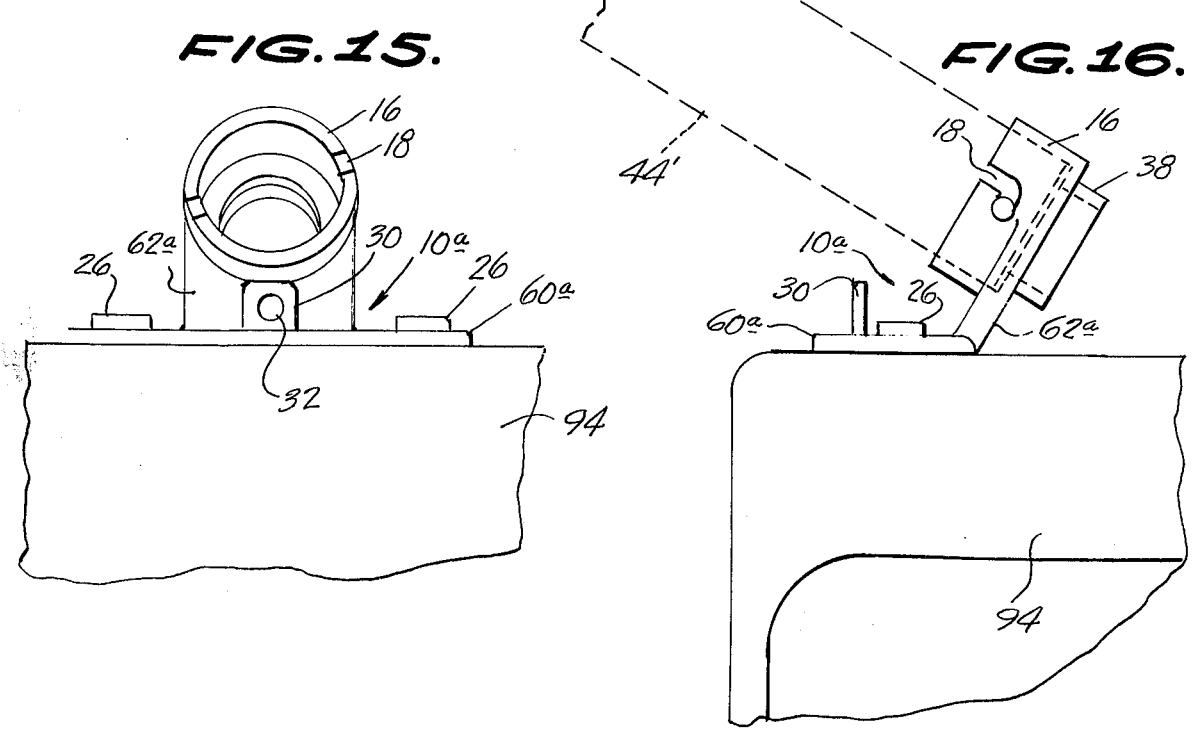

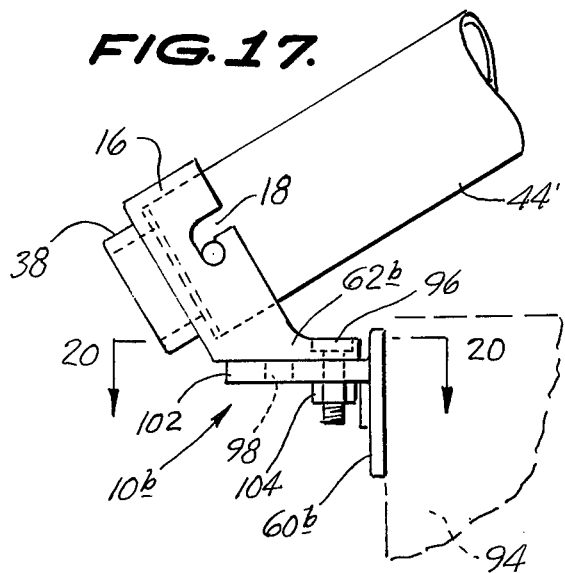
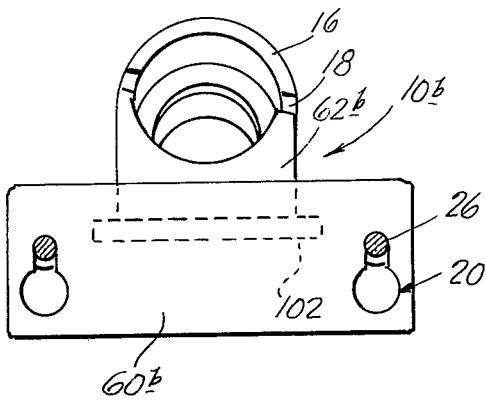
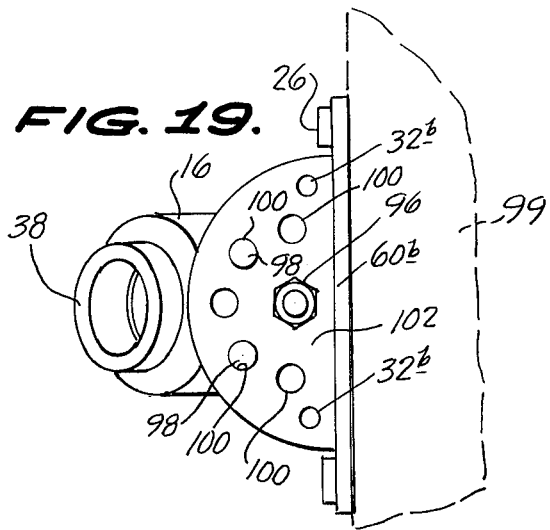
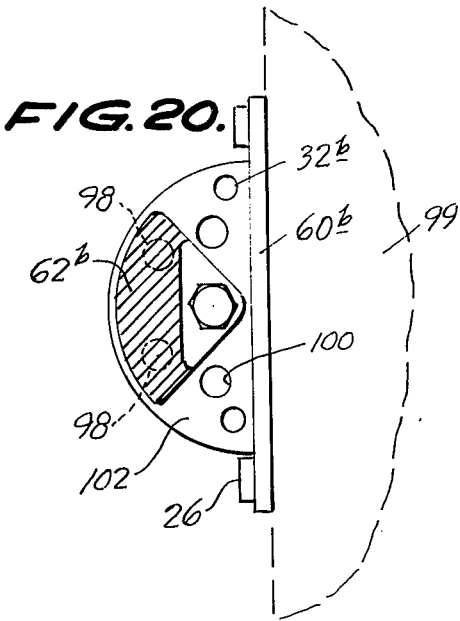
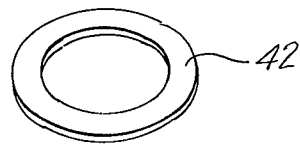

HOLDER ASSEMBLY FOR FISHING RODS AND FISHING ACCESSORIES

BACKGROUND OF THE INVENTION

This invention relates to new and useful improvements in fishing rod holders, or holders for like fishing accessories, such as nets or gaffs.

Fishing rod holders have heretofore been provided for removably supporting a rod on a boat. These holders are normally intended to support a rod in appropriate position while fishing, and to avoid the necessity of the fisherman constantly holding the rod. It is necessary, when a fish strikes, that the rod be removable rapidly and easily from the holder to prevent slack in the line. It is also desirable that when the rod is supported in the holder it remain in one position and not rotate about its own axis. It is further desirable that the holder be adjustable so that an obliquely held rod can be swung to project at different angles from the boat. Prior holding devices fulfill some, or all of the above qualities, but are usable with and fit only a single type and size of fishing rod. The present invention seeks to fulfill all of the above desired qualities, and also to provide replaceable elements which will make the holder universally applicable to all conventional types and sizes of fishing rods, attachable to varying angled supporting surfaces of the boat, and usable for safely storing the rods while cruising to and from the fishing grounds so as to avoid damage, harm, or entanglement of lines. The holder is further advantageous in that it is readily detached from its supporting surface, so that it may be stored to prevent theft while not in use.

SUMMARY OF THE INVENTION

Accordingly this invention resides in the provision of a holder assembly for a fishing rod, or like fishing accessory, having as its primary objective the provision of a holder comprising a number of readily replaceable elements which may be changed to hold any standard conventional rod though of different type and size, during cruising to and from the fishing grounds and during actual fishing, as in trolling.

Another important objective of the invention is to provide a holder assembly for fishing rods, or the like, having the above described characteristics, wherein the elements of the holder are a mounting base having a socket, and a sleeve removably secured in said socket for holding the rod or accessory, a plurality of sleeves being made available capable of receiving all standard fishing rod handles, and all such sleeves being readily attachable to or detachable from the same mounting base.

A further object of the invention is to provide a holder assembly for a fishing rod or the like, having the above described characteristics, wherein the mounting base is normally formed integral with the socket, the base further having keyhole connection means for quick attachment to or detachment from a supporting surface, so that the base and an assembled sleeve may be stored in a safe place, when not in use, to prevent theft.

A still further object of the invention is to provide a holder assembly for fishing rods and the like, having the above described characteristics, wherein a series of interchangeable mounting bases are provided, all having the same sized socket, but which socket is differently arranged for mounting the holder on horizontal, vertical or angled support surfaces and with differing angles of the socket axis in relation to the support surface, so that a fishing rod may be held in the sleeve of the holder at an appropriate angle for trolling.

Yet another object of the invention is to provide a holder assembly for fishing rods, or the like, having the above described characteristics, wherein the mounting base includes a socket which may be easily and quickly positioned in any one of a number of positions.

A further object of the invention is to provide a holder assembly for fishing rods, having the above described characteristics, wherein the holder, and particularly the sleeve thereof, has means associated therewith for preventing the turning of the rod in the holder.

Yet a further object of the invention is to provide a holder assembly for a fishing rod, or the like, having the above described characteristics, which is securable to various parts of a boat to hold a fishing rod either upright or at an oblique angle during still fishing or trolling, and to hold the rod in storage while cruising to the fishing grounds, or return, so that the rod will not be stepped upon, broken or otherwise damaged during such storage periods.

Another object of the invention is to provide a holder assembly for a fishing rod or the like, having the above described characteristics, and which upon selection and attachment of the appropriate sleeve is universally capable of holding any standard conventional fishing rod securely during storage, or during fishing, without the necessity of modifying the rod or its handle.

A still further object of the invention is to provide a holder assembly for a fishing rod, or the like, wherein the parts are of simple construction, easy to fabricate, and inexpensive to make.

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

BRIEF DESCRIPTION OF THE DRAWINGS

FIG. 1 is a perspective view of a dual holder assembly according to the invention mounted in a boat, partially shown, and showing in broken lines a fishing rod and fish net stored in the holder;

FIG. 2 is an enlarged plan view of the holder assembly alone;

FIG. 3 is an elevation, partly in section, taken along line 3—3 of FIG. 2 and looking in the direction of the arrows;

FIG. 4 is an end view of the holder of FIGS. 1-3;

FIG. 5 is an enlarged perspective view of a slightly modified sleeve alone which forms part of the holder assembly;

FIG. 6 is a plan view of a modified holder assembly according to the invention having only one socket in its base and one sleeve;

FIG. 7 is an elevational view of the holder of FIG. 6;

FIG. 8 is an exploded perspective view of another embodiment of the invention together with a portion of a boat in which it is to be mounted and part of a fishing rod handle;

FIG. 9 is a plan view of the mounting base of the holder shown in FIG. 8;

FIG. 10 is a side elevation of the FIG. 9 mounting base;

FIG. 11 is a lateral central, cross-sectional view of the mounting base of FIGS. 9 and 10;

FIG. 12 is a fragmentary sectional detail through the sleeve of the holder taken on line 12—12 of FIG. 8 and looking in the direction of the arrows;

FIG. 13 is an end elevation of a holder assembly with a fishing rod therein and showing still another embodiment of the invention;

FIG. 14 is a side elevation of the mounting base only of the holder shown in FIG. 13;

FIG. 15 is a side elevation of a mounting base according to still another embodiment of the invention;

FIG. 16 is an end elevation of the mounting base shown in FIG. 15;

FIG. 17 is an end elevation of a holder assembly showing yet another embodiment of the invention;

FIG. 18 is a side elevation of the mounting base shown in FIG. 17;

FIG. 19 is a bottom plan view of the mounting base shown in FIG. 17;

FIG. 20 is a sectional view taken on line 20—20 of FIG. 17 and looking in the direction of the arrows;

FIG. 21 is a perspective view of a resilient washer used in the socket of all of the illustrated mounting bases.

DESCRIPTION OF PREFERRED EMBODIMENTS

Referring now in particular to the drawings, the holder assembly according to one embodiment of the invention is shown in FIGS. 1-4 as comprising a mounting base 10 which in longitudinal section has an inverted U-shape with flat horizontal feet 12 connected by legs 13 of the U to the horizontal bight 14. Thus the horizontal leg portions 12 are downwardly offset from the upper horizontal platform 14. Integrally formed on the base and extending vertically upward from the platform 14 are a pair of sockets 16, each provided with a pair of bayonet slots 18 extending downwardly from its upper rim. In each foot portion 12 is provided a keyhole-shaped, slot 20 having an enlarged diameter, or width, portion 22 connecting with a narrower width, elongated portion 24. The pair of keyhole slots 20 are aligned with each other and the two slots coact with a pair of screws or headed pins 26 to releasably mount the base on a supporting surface such as 28 illustrated as being the deck of a boat cockpit near the rear transom and approximately centrally thereof. It will be readily understood that, in the nature of keyhole connections, the base 10 may be easily and quickly mounted by lowering the large portions 22 of slots 20 over the heads of the screws 26 and then sliding the mounting plate 10 forwardly, as viewed in FIG. 1, so that the shanks of the screws ride into the narrow portions 24 of the slots, thus retaining the base fixed on the supporting surface 28. To quickly remove the base from the supporting surface it is merely necessary to pull the base 10 rearwardly to align the enlarged portions 22 of slots 20 with the heads of screw 26 and then lift the mounting plate 10 upwardly and away from the supporting surface 28.

In addition to the described structure of the mounting base, each foot portion 12 includes an upstanding lug 30 with an aperture 32 therein for reception of the fishing hook, or lure, at the end of a fishing line 34, FIG. 1. Each integral socket 16 includes a coaxial dependent collar 38 which extends below the upper flat portion 14 of the mounting base and which is of smaller diameter than the upper portion of the socket leaving a shoulder 40, FIG. 3, on which is seated a resilient washer 42 best seen in FIGS. 3 and 21. The purpose of this washer will become apparent later.

Removably seated in each socket 16 is a tubular sleeve 44 which has a constant diameter, such that the sleeve closely fits within the enlarged diameter portion 16 of the socket, except that the upper rim of the sleeve is flared outwardly slightly as at 46. Near the bottom of each sleeve is fixedly mounted a pair of protruding pins 48 each having a head 50 internally of the sleeve. The pair of pins 48 project outwardly from the sleeve holder along a diameter of the sleeve for cooperation with the bayonet slots 18 of the socket portions 16. The pins may be affixed to the sleeves in any suitable manner as by force fit through apertures therein, by welding, brazing or the like. It is evident that the elongated sleeve 44 may be readily attached to the mounting plate 10 by slipping each sleeve downwardly with the pins 48 aligned with the slots 18, and then turning the sleeve so as to engage the pins in the bent portions of the slots 18, in the conventional manner of attaching bayonet connected elements. The rubber gaskets 42 serve to press the bottoms of the sleeves upwardly so as to tightly engage the pins 48 in the bent or hooked portions of the bayonet slots 18 and thereby prevent undesired disengagement of the sleeve from the socket. To readily remove the sleeves it is merely necessary to press the sleeves downwardly and turn them slightly and then pull the sleeves upwardly so that the pins 48 move through the slots 18.

In FIG. 1 the holder assembly is shown mounted by means of screws or pins 26 on the floor 28 of a cockpit, close to the rear center and near the gunwale. A fishing rod is shown in broken lines mounted in the left holder sleeve 44 with its handle extending entirely through the socket 16 and its extension 38 and resting against the floor 28, the hook 34 on the fishing line 36 being engaged in the aperture 32 of the lug 30 and the line 36 being made taut by conditioning the reel to drag condition. Thus there is no chance that the fishing rod can fall out of its holder even under the roughest cruising conditions. In the right holder sleeve 44 there is shown in broken lines a fishing net 54 with its handle 56 inserted through the sleeve and socket portions 16 and 38 and resting on the floor. The sleeves 44 can of course be utilized for other fishing accessories such as gaffs, and the like. Basically the described holder is used for storage of rods and accessories while running to and from the fishing grounds. This eliminates the need for laying the rods down on the deck, beside the seats, against the transom, etc. It prevents breaking or damaging the rods and entanglement of the fishing gear with each other or with clothing and the like, even though the rods are completely rigged with lures or hooks for fishing since the hooks are engaged in the hook holders 30. The holder described may be used for trolling in inclement weather when the fisherman is forced to seek shelter under the boat top, since the rod is handy in the sleeve 44 for ready removal to play the fish, the fisherman remaining under the boat top which is located close to the mounting.

During actual fishing use, particularly trolling, the hook 34 is released from the lug 30 and the hooked line 36 trails the moving boat in the water. Since the handle of the fishing rod is loosely received in the sleeve 44, the rod can be quickly lifted out of the sleeve by the fisherman when there is a strike, in order to play the fish. While the rod handle is in the sleeve 44 there is little danger that the rod will fall out becuase of the deep penetration of the handle entirely through the sleeve 44 and the socket parts 16 and 38 to the floor. The weight of the rod, and the reel also ensure retention in the holder assembly. During trolling the drag of the lines exerts pressure of the butt of the rod handle at right angle to the axis of sleeve 44 and the cork of the rod handle bites against the socket parts 16 and 38 to ensure retention and stability. The reduced collar 38 of the socket prevents grooving of the rod butt. It is contemplated that the sleeves 44 will be supplied in three lengths, say 5 inches, 7½ inches and 10 inches, to receive different sized fresh water fishing rods now available on the market.

In FIG. 5 a small modification of the tube 44 is shown under the reference numeral 44'. This sleeve is in all respects identical with sleeve 44 except that a notch 52 is formed in the upper rim of the sleeve to receive and seat the finger grip of a fishing rod.

In FIGS. 6 and 7 is shown a modified holder assembly which in all respects is identical with that illustrated in FIGS. 1–4, except that the mounting base 10' has a shortened upper portion 14' containing only a single socket 16 and socket extension 38 rather than a pair of sockets, and the bayonet slots 20 in the leg portion 12 are reversed in direction with respect to each other so that the enlarged circular opening 22 of one slot faces opposite to the corresponding enlarged opening 22 of the other slot. With this arrangement, the screws 26 coacting with the slots are placed in the deck to align with the respective openings 22, and to secure the mounting plate 10' it is then necessary to twist, or turn, the mounting plate so that the shanks of the screws will ride into the small width portions 24 of the keyholes 20. To release and remove the mounting plate it is then necessary to turn, or twist, the mounting plate in the opposite direction so as to again align the heads of the screws with the enlarged openings 22 so that the mounting base 10' may be lifted away from the deck.

The mounting assembly illustrated in FIGS. 6 and 7 is preferably mounted on the center line of the boat in front of an outboard motor well, in front of the engine of an inboard-outboard, or in front or in back of an inboard motor. This enables trolling down the middle, or to utilize the holder assembly for the storage of a net, or gaff (with point protected), while fishing so that availability is assured from any point in the rear of the cockpit. The holder assembly may also be used for storage of a rod, net or gaff while traveling to and from the fishing grounds.

In FIGS. 8–12 is shown another modified version of the holder assembly which is similar to that of FIGS. 6 and 7 but is shown mounted inside a gunwale for straight-up trolling, the gunwale being reference 58, FIG. 8. The modified mounting base 10" may be similarly mounted inside of a transom, or angled or an engine housing, or at a transom center for down the middle trolling. The mounting base 10" is in all respects similar to the mounting base 10' except that in place of the horizontal foot portions 12' a vertical mounting plate 60 is utilized containing the pair of keyholes 20 and the pair of fish hook holders 30. The coaxial socket portions 16 and 38 are integrally connected to the base plate 60 by a horizontal flange or bracket portion 62. The keyholes 20 have their enlarged portions headed in the same direction.

A modified holder sleeve 44" is illustrated in FIGS. 8 and 12, the modification being such that the sleeve is capable of receiving the larger diameter handles of the conventional fishing rods utilized for salt water or deep sea fishing. Such a handle is referenced at 64 and contains a pair of crossed slots 66 in its butt. The sleeve 44" has a lower portion 68 which is the same diameter as the sleeve 44 of FIGS. 2–4 and this portion has affixed thereto the protruding bayonet pins 48 for coaction with the bayonet slots 18 in the socket 16. The upper and major portion 70 of the sleeve 44" has an enlarged diameter suitable for receiving the larger handles of standard salt water fishing rods and is connected by a tapered portion 72 to the lower portion 68. A pin 74 diametrically crosses the inside of the sleeve near the bottom of sleeve portion 70. Pin 74 passes through openings in the sleeve and has a head 78 and securing screw 80. The pin 74 functions to seat in one of the crossed slots 66 in the butt of the fishing rod handle and thus prevents the fishing rod from turning in the sleeve 44". When the fishing rod to be held is of a type that does not have cross slots 66, the pin 74 may be easily removed by unthreading screw 80 and removing the pin from the diametrically located apertures in which it is seated. Then the fishing rod may be slid downwardly in the sleeve 44" until its butt frictionally engaged the inner wall of the socket extension 38 and the reel of the fishing rod seats on the flared rim 46 of the sleeve. Desirably the sleeve 44" will be made available in at least three different lengths such as 10 inches, 12 inches and 15 inches. All of these sleeves will fit in the socket 16 of the mounting base. Since many fisherman operate in both fresh and salt water using different rods they will merely have to purchase the longer and larger diameter salt water sleeves 44" to make the switch from holding one type of rod to the other.

FIGS. 13 and 14 illustrate a holder assembly in which the mounting base is modified for 30° angle trolling, that is the rod is held in the holder at an angle of 30° to the horizontal rather than 90°. In this embodiment the mounting base is very similar to that of FIGS. 9–11 with minor differences as will be explained. The vertical mounting plate 60' may be mounted inside a gunwale 82 and includes the usual pair of bayonet slots 20 and hook holders 30. As shown in FIG. 13 base plate 60' is mounted against the inner surface of the gunwale by means of the usual keyhole pins 26, FIG. 14. The plate 60' can be secured against any inside surface, such as that of a transom, as long as it is either vertical, or slightly angled to the vertical, and this enables the holder to be utilized for straight back trolling. The mounting base 10''' incorporates the same socket 16 with its downward extension 38 whose joint axis is disposed at an angle of about 30° to the horizontal by means of a horizontal bracket portion 62' integrally connecting the socket to the vertical plate 60'. A fishing rod handle with butt 64' is shown loosely housed in the sleeve 44' with a finger grip 84 of the handle seated in the notch 52 of the sleeve. The rod includes a reel 86 whose lower cross rod is releasably clamped and pressed downwardly and to the right by an S-shaped hook 90 of a safety cord 88, which is preferably formed of resilient material. A second and similar hook 92 on the lower end of the safety cord hooks into the aperture 32 of the fish hook holder 30. Thus the rod is securely held within the sleeve 44' during the time the rod is used for trolling or merely being stored in the holder assembly. To release the rod from the holder, it is merely necessary to stretch the safety cord 88 sufficiently to unclamp either hook 90 or 92 and to lift the fishing rod upwardly and to the left, as viewed in FIG. 13, out of the sleeve 44'.

Another modified mounting base 10a is illustrated in FIGS. 15 and 16 for mounting the holder on top of a transom 94 to enable angle trolling. This mounting base may be mounted on slanted surfaces of an engine housing of an outboard motor well, or on the rear of an angled inboard engine housing for down the middle trolling. The mounting base 10a includes a horizontal flat mounting plate 60a provided with the usual pair of keyhole slots, not visible, and a hook holder 30. Integrally connected to the base 60a by an angled bracket member 62a is the socket 16 with its downwardly extending smaller collar 38 whose axis is disposed at an angle of 30° to the horizontal.

Yet another embodiment of the invention is illustrated in FIGS. 17–20 wherein is shown a two part mounting base 10b capable of adjustably indexing the socket for the holder sleeve to different angles. Mounting base 10b includes the usual socket 16 with downward reduced extension 38 integrally connected to a flat, horizontal arm 62b by an angled connecting neck. A pivot bolt 96 with a hexagonal head passes through a vertical aperture in the arm 62b, the head being seated in a complementary recess in the upper surface of the arm, and an aligned opening in ledge 102. Dependent from the bottom surface of arm 62b are a pair of lugs 98 which fit into a selected pair of spaced apertures 100 arranged in a circle whose radius is equal to the distance from the center line of the opening which receives the bolt 96 to the center line of a lug 98. The apertures 100 pass vertically through a horizontal ledge 102 integrally formed on the vertical base plate 60b, which houses the usual pair of keyhole slots 20 for keyhole connection and mounting on the inside vertical wall surface of gunwale 99. A pair of hook holder apertures 32b are formed in the horizontal ledge 102, outside of the circular line of the apertures 100. A nut 104 when tightened on bolt 96 clamps the ledge 102 and the arm 62b together with the lugs 98 positioned in the selected apertures 100. In the clamped condition illustrated in FIGS. 17, 19 and 20 the fisherman is enabled to troll straight out from the gunwale the rod seated in sleeve 44' being disposed at 90° to the gunwale and 30° to the horizontal. Should it be desired to incline the holder and rod either 30° forward or 30° aft, it is merely necessary to loosen nut 104 sufficiently to lift the arm 62b high enough to displace the lugs 98 from the apertures 100 and turn the arm in the appropriate direction and replace the lugs in another pair of apertures. Nut 104 may then be tightened to clamp the arm 62b and ledge 102 and thereby hold the socket 16 and sleeve 44' together with a fishing rod deposited therein at the newly selected angle.

It should be obvious that the holder assembly as described lends itself readily to production as by casting, molding, forming, drawing, machining or other conventional processes. The parts may be fabricated of brass, bronze, stainless steel, plastics or other materials resistant to a water environment.

It will be apparent from the above, that the various embodiments of the invention described have numerous advantages including the ability to support a large variety of standard fishing rods and fishing accessories either in vertical position, or in inclined positions, for safety during storage and for actual trolling use as well. While the rod butts generally fit fairly loosely in the holder sleeve, the base is provided with hook holders for securing either the lure, or hook, of a fishing line, or the hook of a safety cord to ensure that the rods will not fall out of the sleeves. The reduced diameter, dependent collar 38 on the socket permits deeper penetration of a rod handle completely through the holding sleeve and thus enhances the security of the holding function. Under trolling conditions the drag of the fishing line and force of a strike exert pressure on the fishing rod in a direction perpendicular to the axis of the sleeve holder, and the cork or rubber of the butt of the fishing rod handle will engage the wall of the collar 38 and thereby prevent the grooving that would ordinarily occur upon engagement with a sharp bottom edge of a socket such as 16. The reduced collar 38 more snugly engaging the rod butt also reduces the pull necessary to remove a rod upwardly under heavy drag conditions. The described holders have been designed to permit mounting of the holder assembly on gunwales, transoms, cockpit floors or almost any angled surface such as that of an engine housing, or the like.

Although certain specific embodiments of the invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. A holder assembly for fishing rods and like fishing accessory devices, comprising a mounting base having at least one tubular socket fixed thereon, said mounting base including at least one flat portion and a pair of keyhole slots therein each slot having a portion of small width to receive the shank and a portion of larger width to pass the head of a keyhole screw or nail for readily securing and detaching the base to and from a supporting surface, said socket having an upper part of given diameter and a lower part of lesser diameter, said lower part being open at the bottom for passage of part of the tapered butt end of a fishing rod, a sleeve for slidably receiving and holding a fishing rod handle or the like, a pair of bayonet slots disposed diametrically in the upper rim of said socket, a pair of pins protruding from said sleeve for detachable securement in said slots whereby the sleeve is also readily securable and detachable, and a resilient washer seated on a shoulder formed between said upper and lower parts of the socket and serving to resiliently press the base of said sleeve upwardly to exert a retaining force on said sleeve pins in the bayonet slots of the socket.

2. A holder assembly for fishing rods and the like according to claim 1, wherein said portions of small width of said pair of bayonet slots are directed in opposite directions.

3. A holder assembly for fishing rods and the like according to claim 1, wherein said mounting base includes at least one outstanding lug having an aperture therethrough for seating the hook of a fishing line.

4. A holder assembly for fishing rods and the like according to claim 1, wherein said flat portion of the mounting base is horizontal and said integral socket has a vertical axis.

5. A holder assembly for a fishing rod or the like according to claim 4, wherein said base has a second flat portion offset vertically above the first flat portion, said socket being integral with the second portion.

6. A holder assembly for a fishing rod or the like according to claim 1, wherein said flat portion of the mounting base is vertical and said integral socket has a vertical axis.

7. A holder assembly for a fishing rod or the like according to claim 1, wherein said flat portion of the mounting base is vertical and the axis of said socket is at an oblique angle thereto.

8. A holder assembly for a fishing rod or the like according to claim 1, wherein said flat portion of the mounting base is horizontal and said axis of the socket is inclined at an oblique angle thereto.

9. A holder assembly for a fishing rod or the like according to claim 1, wherein said sleeve has a constant diameter except that the upper edge is flared outwardly.

10. A holder assembly for a fishing rod or the like according to claim 1, wherein said sleeve has a notch in its upper rim to receive and seat a finger grip of a fishing rod handle.

11. A holder assembly for a fishing rod or the like according to claim 1, wherein said sleeve has a lower end portion of a diameter slightly smaller than that of said socket in the mounting base, said pins protruding from said lower end portion, said sleeve having an upper portion of larger diameter to receive larger diameter fishing rod handles, and the lower and upper parts of said sleeve being connected by a tapered portion.

12. A holder assembly for a fishing rod or the like according to claim 11, wherein a stop pin is positioned diametrically across the sleeve near the lower end of said upper portion of the sleeve, said pin serving to seat in a notch on the butt of a fishing rod to prevent its turning, and means is provided for ready removal of said stop pin from the sleeve.

13. A holder assembly for fishing rods and the like according to claim 1, wherein said mounting base is formed in two parts, the first part extending vertically and having a horizontal flange integrally formed thereon, a central aperture in said flange for receiving a pivot and holding bolt, said central aperture being surrounded by circular series of spaced apertures passing vertically through said flange, the second part of the mounting base including a horizontal bracket bent upwardly at one side and integrally connected to said socket so as to dispose the axis of the socket at an oblique angle to the horizontal, said horizontal bracket having an aperture aligned with said central aperture of the first part and a projection dependent from its lower surface, a pivot and holding bolt passing through said aperture in the bracket and said central aperture in the first part of the mounting base, said dependent projection on the bracket being removably seated in one of said apertures of said semispherical series of apertures in the mounting base flange.

14. A holder assembly for a fishing rod or the like according to claim 13, wherein is additionally provided in said mounting base flange an additional aperture spaced from said semicircular series of apertures to receive the hook of a fishing line.

* * * * *